(12) United States Patent
Pearse et al.

(10) Patent No.: US 6,488,327 B1
(45) Date of Patent: Dec. 3, 2002

(54) SEATING AND CARGO STORAGE SYSTEM FOR A VEHICLE

(75) Inventors: Stephen C. Pearse, Ann Arbor, MI (US); Kenneth S. Karpczuk, Brighton, MI (US); William J. Hentges, Plymouth, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/939,189

(22) Filed: Aug. 24, 2001

(51) Int. Cl.⁷ .................................. B60N 2/04
(52) U.S. Cl. .................. 296/65.05; 296/69; 296/37.15; 297/188.1; 297/335
(58) Field of Search .................... 296/63, 64, 65.01, 296/65.05, 66, 69, 37.14, 37.15, 37.16; 297/188.02, 188.04, 188.05, 188.07, 188.09, 188.1, 188.13, 188.14, 188.15, 188.19, 326, 335

(56) References Cited

U.S. PATENT DOCUMENTS

| | | | |
|---|---|---|---|
| 1,454,618 A | * 5/1923 | Banks | 296/24.1 |
| 3,169,792 A | 2/1965 | Viquez | 296/99 |
| 4,475,763 A | 10/1984 | Hamatani et al. | 296/65 R |
| 4,480,868 A | 11/1984 | Koto | 296/190 |
| 4,750,778 A | 6/1988 | Hoban | 296/66 |
| 4,771,507 A | 9/1988 | Draplin et al. | 16/297 |
| 5,039,155 A | * 8/1991 | Suman et al. | 296/37.15 |
| 5,398,995 A | 3/1995 | Hurite | 297/378.12 |
| 5,902,009 A | * 5/1999 | Singh et al. | 296/37.15 |
| 5,927,808 A | 7/1999 | Esker | 297/333 |
| 5,934,727 A | 8/1999 | Storc et al. | 296/26.11 |
| 6,012,771 A | 1/2000 | Shea | 297/216.1 |
| 6,076,880 A | * 6/2000 | Coffer et al. | 296/65.01 |
| 6,102,463 A | * 8/2000 | Swanson et al. | 296/37.15 |
| 6,247,741 B1 | * 6/2001 | Seel et al. | 296/37.14 |
| 6,290,277 B1 | * 9/2001 | Spykerman et al. | 224/496 |
| 6,338,518 B1 | * 1/2002 | D'Annunzio et al. | 296/24.1 |
| 6,386,612 B2 | * 5/2002 | Hofmann et al. | 224/275 |
| 2002/0005649 A1 | * 1/2002 | Hofmann et al. | 296/37.15 |

* cited by examiner

*Primary Examiner*—D. Glenn Dayoan
*Assistant Examiner*—Patricia L. Engle
(74) *Attorney, Agent, or Firm*—Foley & Lardner (57) ABSTRACT

A seating system for a vehicle includes a seat portion with a front edge and a rear edge, and a back portion with an upper edge and a lower edge, where the rear edge of the seat portion is connected to the lower edge of the back portion. The system includes a platform portion of the vehicle configured to support an underside of the seat portion when the seat assembly is in a seating position. A pivot connection couples the platform to the seat portion to selectively move the seat assembly from the seating position to a cargo storage position. A cargo storage surface is provided on the underside of the seat assembly that is supported above a floor portion of the vehicle by the back portion of the seat assembly when the seat assembly is in the cargo storage position.

36 Claims, 8 Drawing Sheets

SEATING AND CARGO STORAGE SYSTEM FOR A VEHICLE

FIELD OF THE INVENTION

The present invention relates to a seating system for a vehicle. The present invention also relates to a seating system adaptable for use in a seating application and a cargo storage application.

CROSS-REFERENCE TO RELATED APPLICATIONS

The following patents and/or patent applications are hereby incorporated by reference: U.S. Pat. No. 6,015,071 titled "Vehicle Storage Divider" issued Jan. 18, 2000; U.S. Pat. No. 6,050,202 titled "Storage Divider Shelf" issued Apr. 18, 2001; and U.S. Pat. No. 6,199,948 titled "Interchangeable Module System" issued Mar. 13, 2001.

BACKGROUND

It is well-known to provide seats in vehicles for accommodating the comfort of vehicle occupants and the spatial requirements for cargo storage. The seats are typically movable in either a horizontal or vertical orientation, or both, for improving the comfort of the vehicle occupants and providing the vehicle operator with proper access to the vehicle controls. Such seats typically include seats positioned in a front portion of the vehicle for an operator and for a front passenger, and additionally include one or more rows of seats for passengers in the rear of the vehicle. With the increasing demand for vehicles having improved cargo storage management systems combined with passenger capacity, while maintaining or reducing overall size, weight and cost of the vehicle, it would be desirable to provide a seating system with reduced complexity, improved cargo storage capacity and improved flexibility in using the available cargo storage space.

Rear seating systems in vehicles typically include a seating portion having a generally horizontal seating portion and a generally horizontal back rest portion that are pivotally connected. Such rear seating systems often provide a variety of pivot, hinge, latch, slide and linkage mechanisms between the seat portion and the backrest portion and between the seat portion and the vehicle floor so that the seat portion and the backrest portion may be folded together in a variety of orientations to improve the cargo storage capacity of the vehicle when the rear seats are unoccupied. It would be desirable to provide a rear seating system adaptable for use in both a seating position and a cargo storage position without the need for numerous and complicated mechanisms for moving the seats in order to improve the ease of operation by a user. It would be further desirable to provide a rear seating system without numerous and complicated mechanisms to reduce manufacturing costs, reduce overall vehicle weight, reduce the number of assembly steps needed to produce the seat and reduce the installation time during vehicle assembly.

When folded to a cargo storage position, the known seating systems typically provide for the back rest portion and the seat portion to be collapsed with the planar portion of the seat or back rest in facing engagement with each other and stored adjacent to a planar portion of the vehicle such as a floor or wall section, which reduces their accessability for serving as cargo storage devices when the seating system is in a cargo storage position. Therefore it would be desirable to provide a seating system where the seat and back rest portions remained accessable for serving as cargo storage devices when the seating system is in the cargo storage position.

Such known folding rear seating systems often have a seat portion and back rest portion formed from a frame designed to hold a cushion, which is usually surrounded by an upholstery material to form a comfortable seat for the occupants. Such seating structures typically provide limited adaptability for use as storage devices when the seats are in a cargo storage position. Therefore it would also be desirable to provide a seating system where the seat and back rest portions provide a variety of alternative storage systems for use when the seat portions are in either a seating position or a cargo storage position.

It would be desirable to provide a system having any one or more of these or other advantageous features.

SUMMARY OF THE INVENTION

The present invention relates to a seating and cargo storage system for a vehicle having a seat portion with a front edge and a rear edge, and a back portion with an upper edge and a lower edge, where the rear edge of the seat portion is connected to the lower edge of the back portion. A platform portion of the vehicle is configured to support an underside of the seat portion when the seat assembly is in a seating position and a connection couples the platform to the seat portion to selectively move the seat assembly from the seating position to a cargo storage position. A cargo storage surface is provided on the underside of the seat assembly and is supported above a floor portion of the vehicle by the back portion of the seat assembly when the seat assembly is in the cargo storage position.

The present invention also relates to a seating and cargo storage system for a vehicle having means for moving a seat assembly from an upright seating position to an inverted cargo storage position, means for providing an interchangeable cargo storage surface on an underside of the seat assembly and means for supporting the cargo storage surface in a generally horizontal orientation above a floor portion of the vehicle with a back portion of the seat assembly.

The present invention further relates to a seating and cargo storage system for a rear seat in a vehicle having a seat assembly with an integral, non-articulating seat portion and a back portion and a seat base extending upward from a floor portion of the vehicle and adapted to support an underside of the seat portion. A coupling cooperates between a front portion of the seat base and a front edge of the seat portion to allow the seat assembly to move forward from an upright seating position to an inverted cargo storage position where an upper surface on the back portion of the seat assembly is configured to engage an interior portion of the vehicle to support the seat assembly in the inverted cargo storage position so that the upper surface of the seat base and the underside of the seat portion in the inverted cargo storage position provide a substantially flat cargo storage surface.

DETAILED DESCRIPTION OF EXEMPLARY EMBODIMENTS

Figure 1:
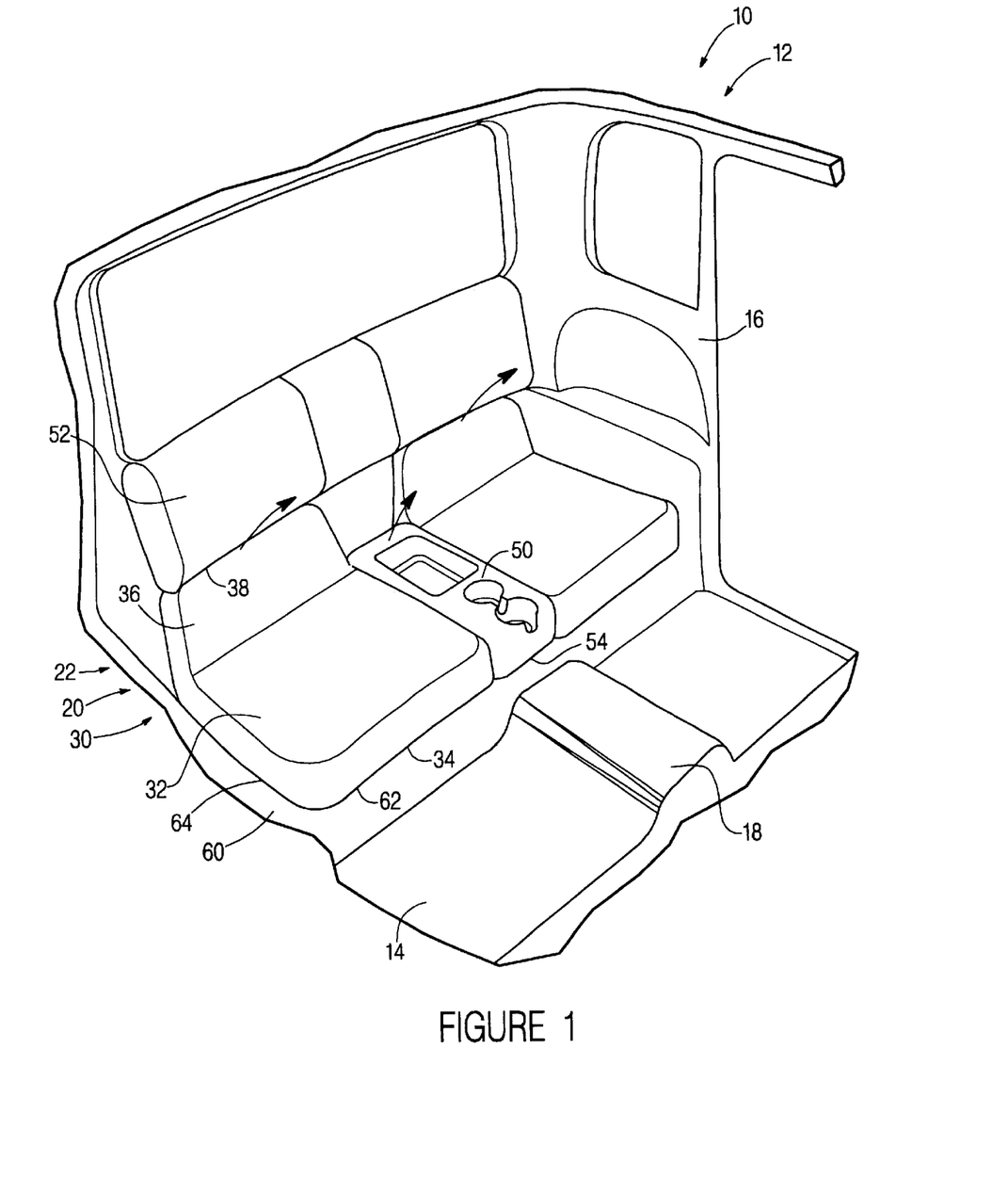
FIG. 1 is a perspective view of a rear seating system for a vehicle in a seating position according to an exemplary embodiment.
Figure 5:
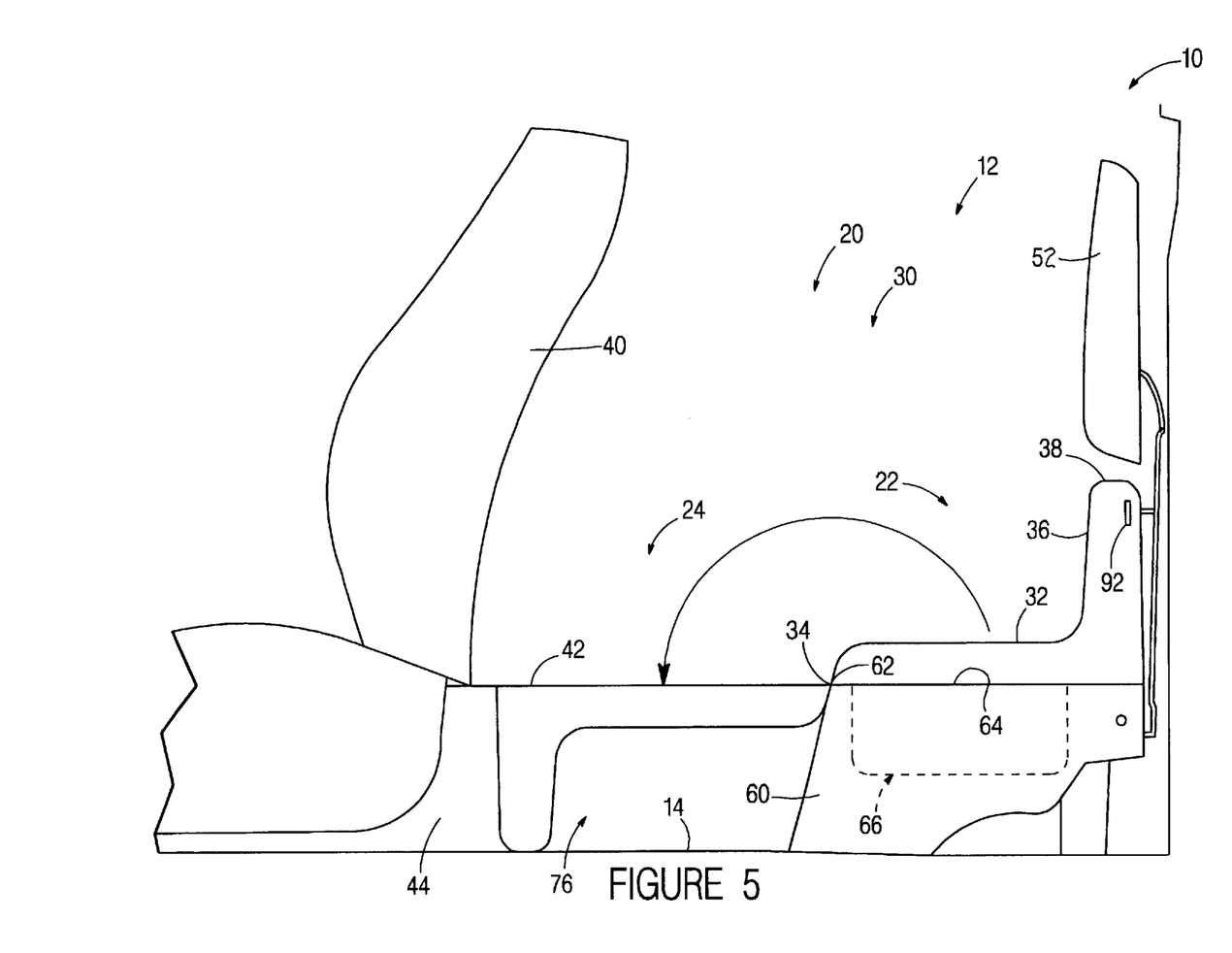
FIG. 5 is a side view of a rear seating system for a vehicle according to an exemplary embodiment.

Referring to FIG. 1, a seating and cargo storage system for a vehicle is shown according to an exemplary embodiment. A vehicle 10 is schematically shown having a rear interior space 12 behind the front seats (as shown in FIG. 5) of vehicle 10 and a floor panel 14 and side panels 16. In a particularly preferred embodiment, vehicle 10 is a light truck, sedan, minivan or sport utility vehicle, however, vehicle 10 may also be a bus, truck, train, plane, boat, recreational vehicle or a construction or farm vehicle in other alternative embodiments. Floor panel 14 may be generally flat, or may include contours such as a raised center portion 18 to accommodate vehicle drive train components or vehicle structural elements (not shown). A rear seat assembly 20 is provided in rear interior space 12 and shown in a seating position 22 having a seat portion 32 and a back portion 36. In a preferred embodiment, seat portion 32 and back portion 36 have a thin base or shell that may be fabricated and joined as an assembly or may be unitarily formed together to provide a generally "L" shaped side profile and is formed in an injection molding process or a blow-molding process using a plastic or polymer material, however other materials and forming processes such as sheet metal may be used in alternative embodiments. A conventional cushion or pad may be provided on the base and shell in a conventional manner to form one or more seats 30 for rear seating assembly 20, or rear seating assembly 20 may be provided as a molded structure without cushions. In a particularly preferred embodiment seat portion 32 and back portion 36 are substantially rigid and fixed to each other so that they form a single unit and have sufficient strength to serve as a supplemental cargo storage surface when used in cargo storage position 24, as shown in FIG. 2.

Figure 3:
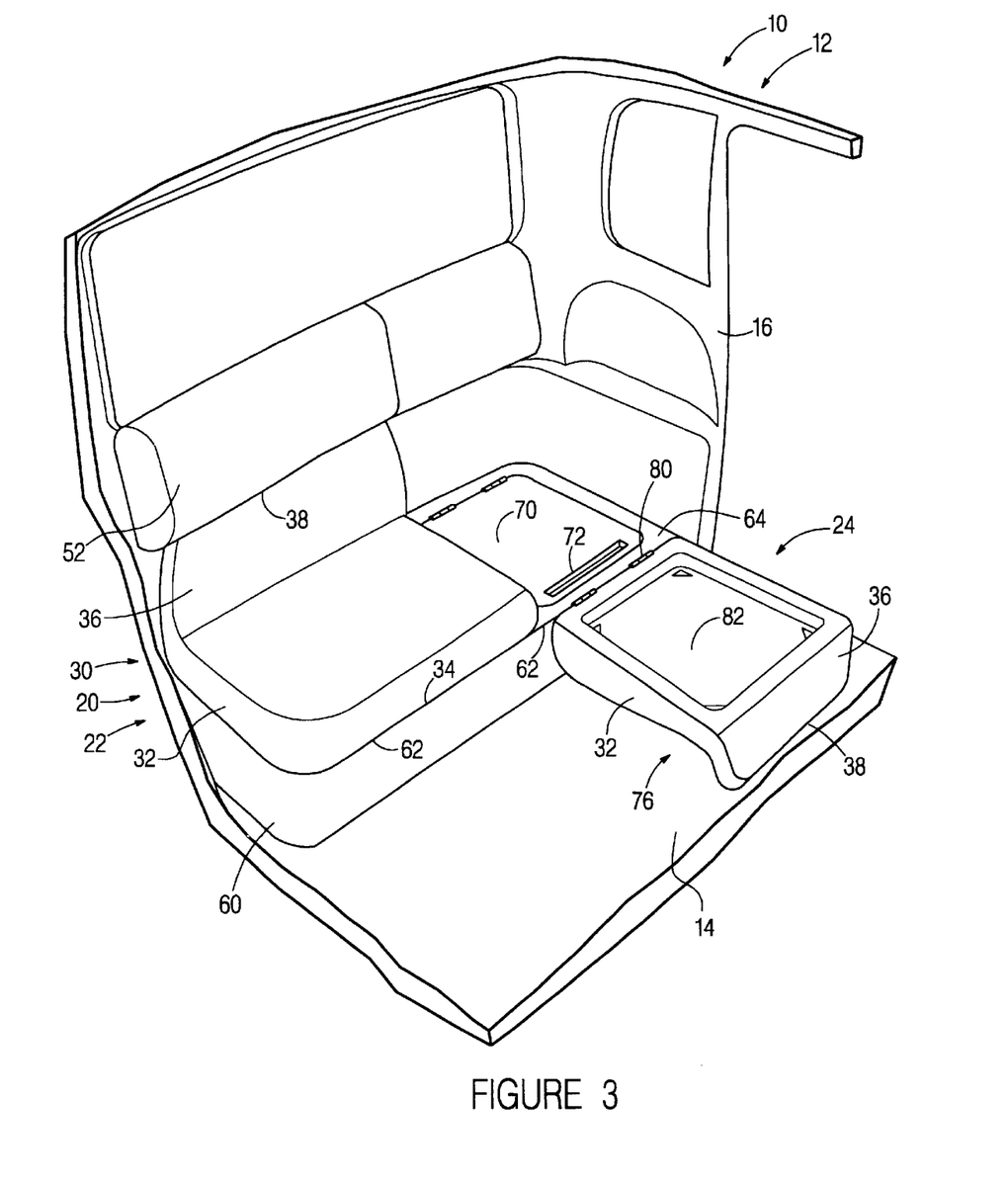
FIG. 3 is a front perspective view of a rear seating system for a vehicle in both a cargo storage position and a seating position according to an exemplary embodiment.

Referring further to FIG. 1, seat portion 32 rests upon a top surface 64 of a seat base or platform 60 that is preferably a raised section or housing extending upward from vehicle floor 14 and may be continuously formed with the vehicle floor or provided as a separately attachable structure. A separate back rest 52 according to any conventional seating system may be fixed to vehicle 10 in cooperation with, and above or adjacent to, back portion 36 to provide an additional range of back cushioning to an occupant. Seat portion 32 and back portion 36 are shown as two independent seats 30 separated by a center console 50, however rear seating assembly 20 may be configured as a single bench-type seat that spans the width of rear interior space 12 and may have a suitably contoured back portion for engaging the vehicle interior structure when moved to the cargo storage position 24. Alternatively, rear seating assembly 20 may be configured having a 60/40 split as shown in FIG. 3 or other suitable proportioning to provide usage flexibility and improved cargo storage options. The rear seating assembly may also be provided with two seating portions separated by a space with or without a center console, or may be provided with multiple seating portions.

Referring further to FIG. 1, seat portion 32 and console 50 have a front lower edge 34 and 54 that is rotationally attached to a front upper edge 62 of platform 60. Rotational attachment may be accomplished by a pivot mechanism 80 shown schematically as a hinge in FIG. 3, but may be any suitable movement of rotation device such as interlocking tabs (not shown) that allow removal of seat 30 from platform 60 and reinstallation in an inverted cargo storage position, or a four bar linkage (not shown), and may be manually positioned by a user or may be provided with a conventional slide-track and power drive system (not shown) to allow remote automatic repositioning of the seat portion from a seating position to a cargo storage position. Seats 30 and console 50 are preferably independent and pivotally movable about pivot mechanism 80 between the seating position 22 of FIG. 1 and the cargo storage position 24 of FIG. 2 as shown schematically in FIG. 5. Back rest 52 and an upper end 38 of back portion 36 are provided with sufficient clearance or contouring to prevent interference when seats 30 are moved from the seating position 22. The depth of the seat portion 32 is preferably sized to provide a comfortable seating area for an occupant, yet provide sufficient rotational clearance with front seat 40 as shown in FIG. 5, when seats 30 are rotated to the cargo storage position 24.

Figure 2:
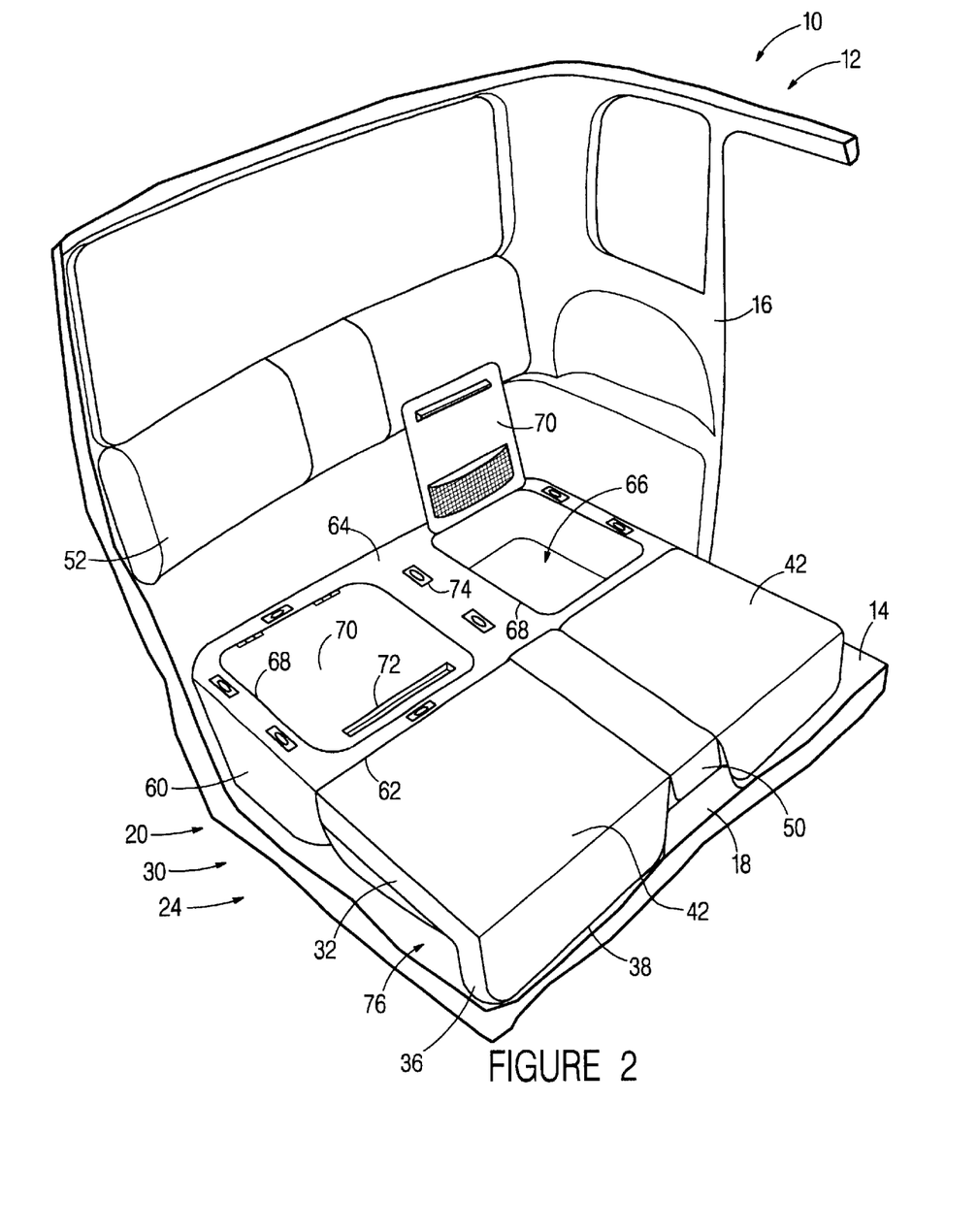
FIG. 2 is a front perspective view of a rear seating system for a vehicle in a cargo storage position according to an exemplary embodiment.
Figure 6:
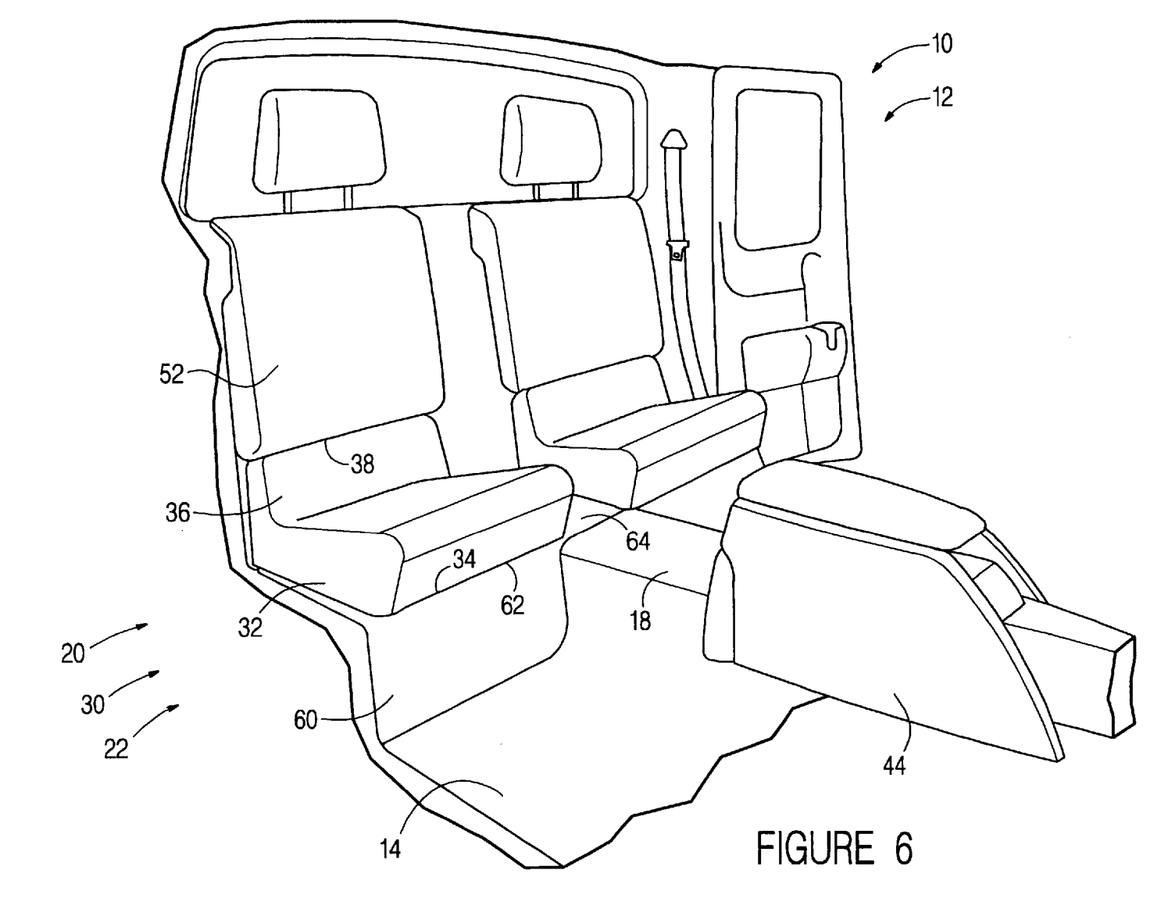
FIG. 6 is a perspective view of a rear seating system for a vehicle in a seating position according to another exemplary embodiment.

Referring to FIG. 2, when the seats 30 and console 50 are moved from the seating position 22 to the cargo storage position 24, the seats 30 are supported on the interior of vehicle 10 by an upper end 38 of back portion 36. Upper end 38 may be sized and shaped to mate with the contour of floor 14 and raised center portion 18 so that an underside of seat portion 32 is in a generally horizontal position to provide a cargo storage surface 42. Seats 30 are preferably sized having a width generally corresponding to the available flat surface of floor 14 on either side of raised center portion 18, but may have various widths and may partially or completely cover raised center portion 18 depending on the elevational clearance between the top surface of raised center portion and the seating surface of seats 30 when inverted in the cargo storage position 24. In a similar manner, center console 50 is sized and shaped to so that an underside of console 50 may be supported in a generally horizontal manner when moved to the cargo storage position 24. Console 50 may have an elevated back portion (not shown) to engage a flat floor surface, or may be contoured to lay directly on the top surface of raised center portion 18 or to engage a front seat center console 44 (shown schematically in FIG. 7) when moved to the cargo storage position 24. In a further exemplary embodiment shown in FIG. 6, a center console may be omitted, or a removable center console may be provided in situations where the height of raised center portion 18 approaches the top surface 64 of platform 60, and the space on top surface 64 between the seating portions may be used to provide cargo storage management features as will be further described. In an alternative embodiment, a carpet or other suitable surface material may be provided on the top surface of the platform and on the bottom surface of the seat portion, having suitable flaps or cut-outs for accessing cargo storage devices and compartments contained therein.

Referring further to FIG. 2, when seats 30 are moved from the seating position 22 to the cargo storage position 24, the underside of seats 30 and console 50 and a top surface 64 of platform 60 combine to provide a generally continuous, flat and horizontal cargo storage surface 42. In a preferred embodiment, platform 60 provides a storage volume 66 beneath top surface 64 for housing bins, compartments or other cargo storage management items to improve the storage capacity within vehicle 10. The bins and compartments may be formed as recesses having a variety of shapes and sizes within top surface 64 or may be an open space beneath top surface 64 and within platform 60. One or more access passages 68 may be provided in top surface 64 of platform 60 for accessing the platform's storage volume 66 and may be provided with covers (e.g. doors panels, etc.) 70 that are hinged or that sit into peripheral recesses (not shown) or that snap-fit into detents (not shown). In an alternative embodiment, the covers may be removable and slide into vertical passages (not shown) on the sides of access passages to provide vertical storage dividers as provided in U.S. Pat. No. 6,015,071. In other alternative embodiments a cover may be omitted and access passages 68 may remain open and the underside of seat portion 32 may itself serve as a removable cover and allow for outwardly projecting storage features to be provided on the underside of seat portion 32 that extend through access passages 68 and into storage volume 66 when seat 32 is in the seating position 22.

Referring further to FIG. 2, covers 70 may be provided with recessed handles 72 or have other lifting handles such as pivotal rings or brackets (not shown) for convenient opening or removal of cover 70. The storage volume 66, covers 70, underside of seat portion 32, top surface 64, and back side of back portion 36 may also be equipped with interchangeable cargo storage management devices such as cargo netting, pouches, containers, partitions, holders, straps, cords or other devices for storing or securing cargo or other items, such as those provided in U.S. Pat. No. 6,015,071 titled "Vehicle Storage Divider" and U.S. Pat. No. 6,050,202 titled "Storage Divider Shelf", which are incorporated herein by reference. Such cargo storage management devices provide adaptability for a variety of cargo storage needs. The top surface 64 of platform 60 and the wall 16 may further have recessed cargo storage or securement devices 74 formed therein, such as tool compartments (not shown) or attachments (e.g. rings, buckles, tie-downs, receptacles, connectors, etc.). Alternatively, such cargo securement devices 74 may project upward from top surface 64 and fit within suitably formed recesses (not shown) within the underside of seat portion 32 or back portion 36.

Referring further to FIG. 2, the generally "L" shaped formation of seat portion 32 and back portion 36 provides an integral cargo storage surface on the underside of seat portion 32, and back portion 36 provides a vertical support column for supporting the cargo storage surface when moved to the cargo storage position 24. The generally "L" shaped formation of seat 30 also provides for additional floor storage space 76 beneath seat portion 32 and above floor 14 in the cargo storage position that remains available and is not otherwise occupied as it often would be with conventional folding rear seat cushions. The volume of this additional floor storage space may be maximized by minimizing the dimensional thickness of seat portion 32 and back portion 34.

Figure 4:
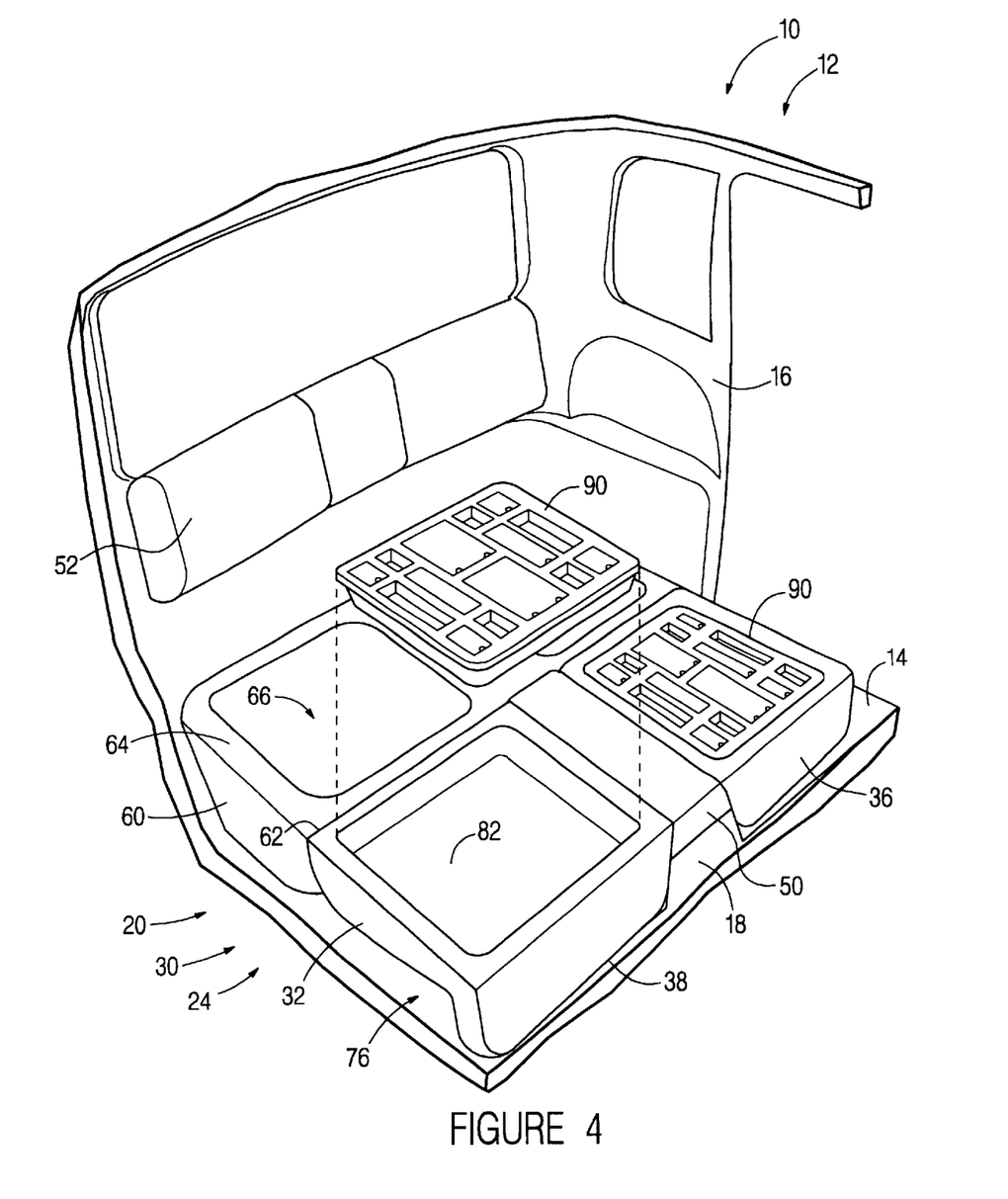
FIG. 4 is a front perspective view of a rear seating system for a vehicle in a cargo storage position according to an exemplary embodiment.

Referring to FIG. 3, the underside of seat portion 32 and the back surface of back portion 36 may also be provided with suitable recesses 82 or storage device options for increasing the cargo storage volume and flexibility for vehicle 10. As shown schematically in FIG. 4, recesses 82 may also be adapted for attachment of interchangeable cargo management devices 90 such as cargo netting, pouches, containers, partitions, holders, straps, cords or other devices for storing or securing cargo or other items, such as those provided in U.S. Pat. No. 6,015,071 titled "Vehicle Storage Divider" and U.S. Pat. No. 6,050,202 titled "Storage Divider Shelf", which are incorporated herein by reference, for improving cargo storage flexibility and options. In an alternative embodiment, cargo management devices 90 may be adapted to attach directly to an underside of seat portion 32, the back surface of back portion 36, the top surface 64, or the covers 70. In a further alternative embodiment, recesses 82 may be adapted to receive any of a variety of interchangeable modules in the manner shown in U.S. Pat. No. 6,199,948 titled "Interchangeable Module System", incorporated herein by reference. Provision of such storage devices on seat 30 allow cargo storage in an easily accessible but concealed manner when seat 30 is used in the seating position or in an accessible manner when seat 30 is used in the cargo storage position. Incorporating these features into seat assembly 30 further reduces the overall weight, and the assembly and installation complexity problems associated with conventional seating and storage systems for vehicles. In an alternative embodiment, pivot mechanism 80 may be include a readily detachable feature (not shown) for removing the seats 30 and the storage management devices for use separate from, or external to, vehicle 10 to improve the utility and convenience of the cargo storage management devices. A latch or other releasable holding device such as an interference fit mechanism (shown schematically as a latch 92) may be provided on the seat 30, platform 60 or wall 16 to releasably hold the seat 30 in the seating position 22, but allow the seat 30 to be readily moved to the cargo storage position 24 by a user or by a power drive and slide-track mechanism (not shown).

Figure 7:
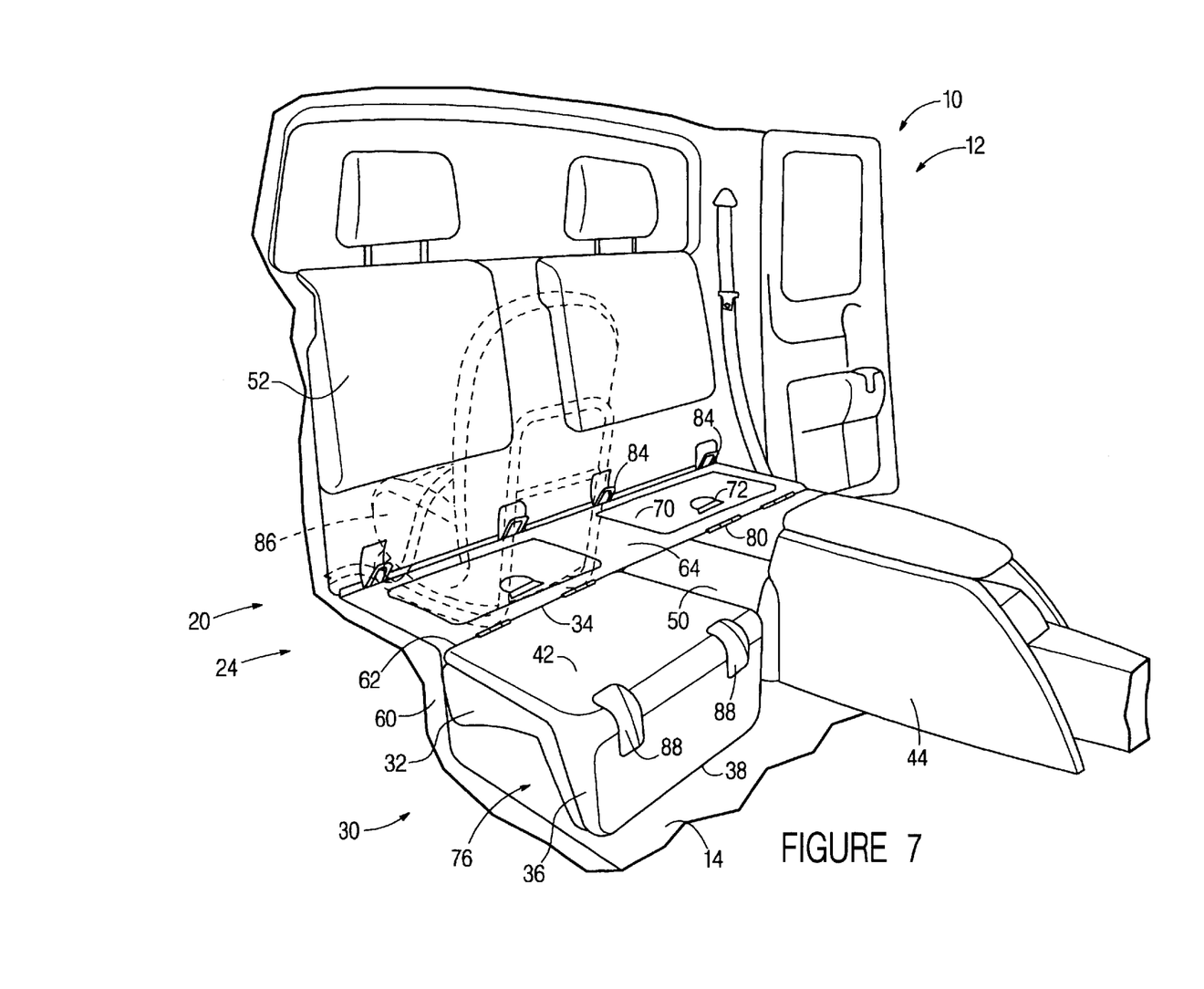
FIG. 7 is a front perspective view of a rear seating system for a vehicle in a cargo storage position according to another exemplary embodiment.
Figure 8:
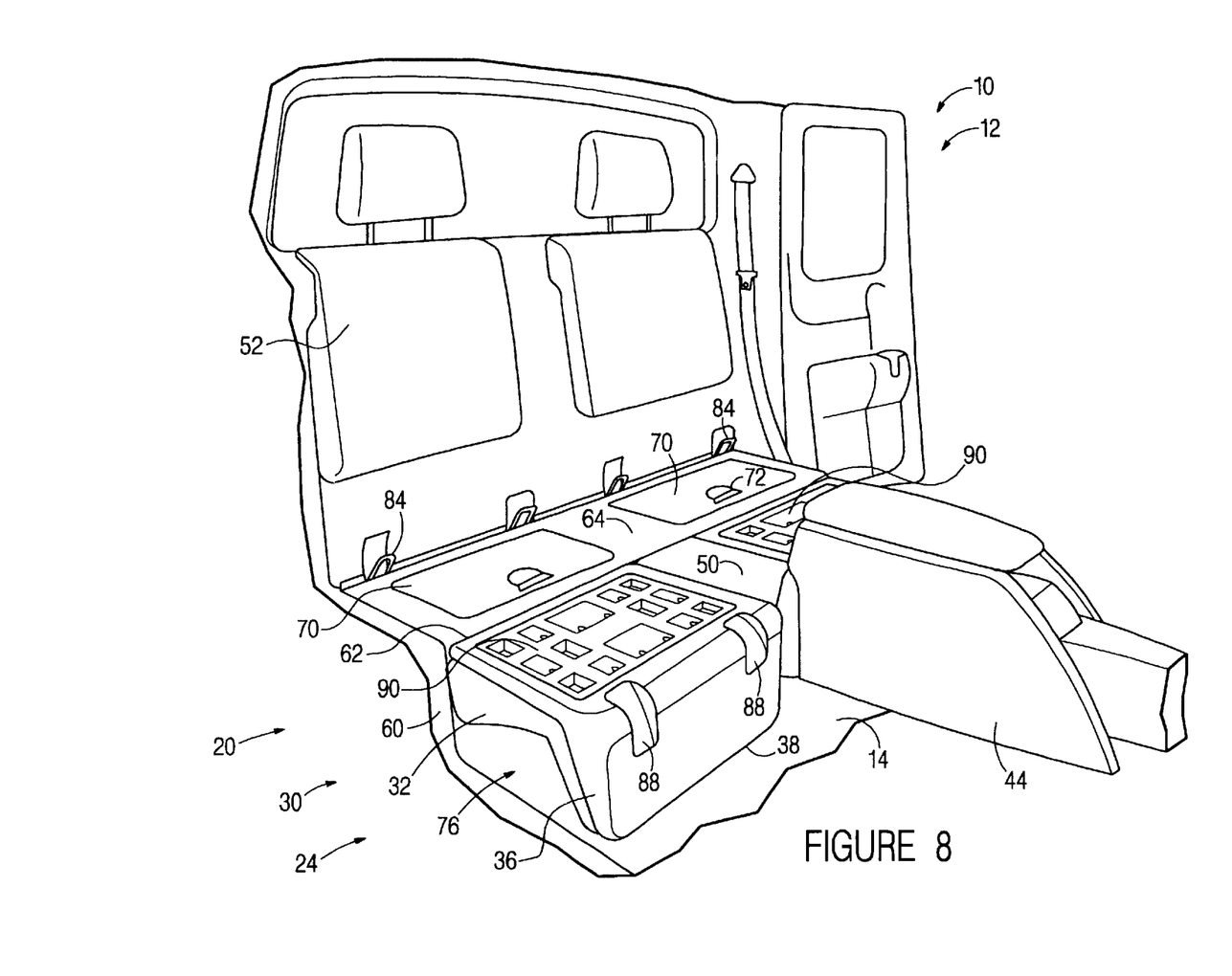
FIG. 8 is a front perspective view of a rear seating system for a vehicle in a cargo storage position according to another exemplary embodiment.

Referring to FIGS. 7 and 8, additional cargo storage features of rear seating system 20 are shown according to an exemplary embodiment. Platform 60 may include outwardly projecting fixtures 84 providing a bracket or other structural attachment for securing items such as a child restraint system, shown as a child safety seat 86 or other cargo on platform 60 when seat 30 is in the cargo storage position 24. Fixtures 84 are anchored to platform 60 or another suitable portion of the vehicle structure, and the underside of seat 30 is provided with corresponding recesses 88 to accommodate the outward projection of fixtures 84.

According to other exemplary embodiments, the seating and cargo storage system may be associated with any vehicles such as an automobile, truck, sport utility vehicle, recreation vehicles, farm or construction equipment, boats, airplanes, trains, etc. It is important to note that the term "cargo storage management device" is intended to be a broad term and not a term of limitation. The term "cargo storage management device," as used in this disclosure, may include, without limitation: brackets, holders, trays, fixtures, bins, compartments, pockets, pouches, nets, straps, cords, tie-downs, hangers, and other items for storing or securing cargo, and is intended to be a broad term and not a term of limitation.

It is important to note that the construction and arrangement of the elements of the seating and cargo storage system as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, interchangeable relationships, use of materials, processes, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A seating and cargo storage system for a vehicle, comprising:
   a seat assembly having a seat portion with a front edge and a rear edge, and a back portion with an upper edge and a lower edge, where the rear edge of the seat portion is connected near the lower edge of the back portion;
   a platform portion of the vehicle configured to support an underside of the seat portion when the seat assembly is in a seating position;
   a connection coupling the platform to the seat portion, the connection operable to selectively move the seat assembly from the seating position to a cargo storage position; and
   a cargo storage surface on the underside of the seat portion, the cargo storage surface supported above a floor portion of the vehicle by the back portion of the seat assembly when the seat assembly is in the cargo storage position.

2. The seating and cargo storage system for a vehicle of claim 1, wherein the seat portion and the back portion are unitarily formed.

3. The seating and cargo storage system for a vehicle of claim 1, wherein the seat portion and the back portion are an assembly.

4. The seating and cargo storage system for a vehicle of claim 1, wherein the back portion is substantially perpendicular to the seat portion.

5. The seating and cargo storage system for a vehicle of claim 1, wherein the seat assembly is in an upright orientation in the seating position and the seat assembly is in an inverted orientation in the cargo storage position.

6. The seating and cargo storage system for a vehicle of claim 5, wherein the platform portion and the underside of the seat portion form a generally horizontal cargo storage area when the seat assembly is in the cargo storage position.

7. The seating and cargo storage system for a vehicle of claim 6, wherein the vehicle is selected from the group consisting of a truck, a sport utility vehicle, a sedan, and a minivan, and the seating assembly is a rear seating assembly.

8. The seating and cargo storage system for a vehicle of claim 7, wherein the seating assembly further comprises a first section and a second section, capable of independent movement and use in the seating position and the cargo storage position.

9. The seating and cargo storage system for a vehicle of claim 7, wherein the seating assembly further comprises a single seat spanning the interior width of the vehicle capable of movement and use in the seating position and the cargo storage position.

10. The seating and cargo storage system for a vehicle of claim 7, wherein the seating assembly further comprises a plurality of sections capable of independent movement and use in the seating position and the cargo storage position.

11. The seating and cargo storage system for a vehicle of claim 1, wherein the platform portion further comprises one or more cargo storage devices adapted for storing cargo in the seating position and the cargo storage position.

12. The seating and cargo storage system for a vehicle of claim 11, wherein the cargo storage device is a compartment formed within one or more of the platform portion, the seat portion and the back portion.

13. The seating and cargo storage system for a vehicle of claim 12, wherein the compartment includes a hinged cover.

14. The seating and cargo storage system for a vehicle of claim 11, further comprising one or more interchangeable cargo storage management devices selected from the group consisting of an interchangeable module, a hook, a strap, a bracket, a holder, a tray, a fixture, a pocket, a net, a cord, a hanger and a tie-down.

15. The seating and cargo storage system for a vehicle of claim 14, wherein the cargo storage management device is adapted to be selectively installed within a compartment formed within the platform portion.

16. The seating and cargo storage system for a vehicle of claim 14, wherein the cargo storage management device is adapted to be selectively installed within a recessed portion formed within the platform portion.

17. The seating and cargo storage system for a vehicle of claim 14, wherein the cargo storage management device is adapted to be attached directly to one or more of the seat portion, the back portion, or the platform portion.

18. The seating and cargo storage system for a vehicle of claim 12, further comprising one or more interchangeable storage management devices adapted to be selectively installed within the compartment.

19. The seating and cargo storage system for a vehicle of claim 11, wherein the cargo storage device further comprises a recessed portion formed within the underside of the seat portion.

20. The seating and cargo storage system for a vehicle of claim 1, wherein the connection is a hinge.

21. The seating and cargo storage system for a vehicle of claim 1, further comprising a selectively releasable latch mechanism for retaining the seat assembly in the seating position and releasing the seat assembly for movement from the seating position to the cargo storage position.

22. The seating and cargo storage system of claim 1 wherein the connection releasably couples a front portion of the platform proximate to a lower front edge of the seat portion.

23. The seating and cargo storage system of claim 1 wherein the seat assembly is removable from the vehicle.

24. A seating and cargo storage system for a vehicle, comprising:
   means for moving a seat assembly from a seating position to a cargo storage position;
   means for providing an interchangeable cargo storage surface on one of an underside of the seat assembly and a top surface of a platform portion; and
   means for supporting the cargo storage surface in a generally horizontal orientation above a floor portion of the vehicle with a generally vertical back portion of the seat assembly.

25. The seating and cargo storage system for a vehicle of claim 24, wherein the seat assembly further comprises one or more sections, capable of independent movement and use in the upright seating position and the cargo storage position.

26. A seating and cargo storage system for a rear seat in a vehicle comprising:
- a pivotal seat assembly having an integral seat portion and back portion, wherein the seat portion and back portion are non-articulating with respect to each other;
- a seat base extending upward from a floor portion of the vehicle, the seat base having an upper surface adapted to support an underside of the seat portion;
- a pivotal coupling cooperating between a front edge of the seat base and a front edge of the seat portion to allow the seat assembly to fold forward from an upright seating position to an inverted cargo storage position;
- an upper surface on the back portion of the seat assembly configured to engage an interior portion of the vehicle to support the seat assembly in the inverted cargo storage position;
- wherein the upper surface of the seat base and the underside of the seat portion in the inverted cargo storage position provide a substantially flat cargo storage surface.

27. The seating and cargo storage system of claim 26 further comprising one or more cargo storage management devices selected from the group consisting of an interchangeable module, a hook, a strap, a bracket, a holder, a tray, a fixture, a pocket, a net, a cord, a hanger and a tie-down.

28. The seating and cargo storage system of claim 27, wherein the cargo storage management devices are coupled to the underside of the seat portion.

29. The seating and cargo storage system of claim 27, wherein the cargo storage management devices are coupled to a back side of the back portion.

30. The seating and cargo storage system of claim 27, wherein the cargo storage management devices are coupled to the upper surface of the seat base.

31. The seating and cargo storage system of claim 26, wherein the seating assembly further comprises one or more sections, capable of independent movement and use in the seating position and the cargo storage position.

32. The seating and cargo storage system of claim 26, wherein the upper surface on the back portion of the seat assembly is adapted to mate with a floor portion of the vehicle.

33. The seating and cargo storage system of claim 26 wherein the seating assembly further comprises a rear center console portion adapted to pivot between an upright console use position and an inverted storage position.

34. The seating and cargo storage system of claim 33, wherein the rear center console in the inverted storage position is adapted to mate with a front center console.

35. The seating and cargo storage system of claim 34 wherein the rear center console in the inverted storage position is adapted to mate with a raised center portion of the vehicle floor.

36. The seating and cargo storage system of claim 26 further comprising a center console that is removable.

* * * * *